Patented June 1, 1948

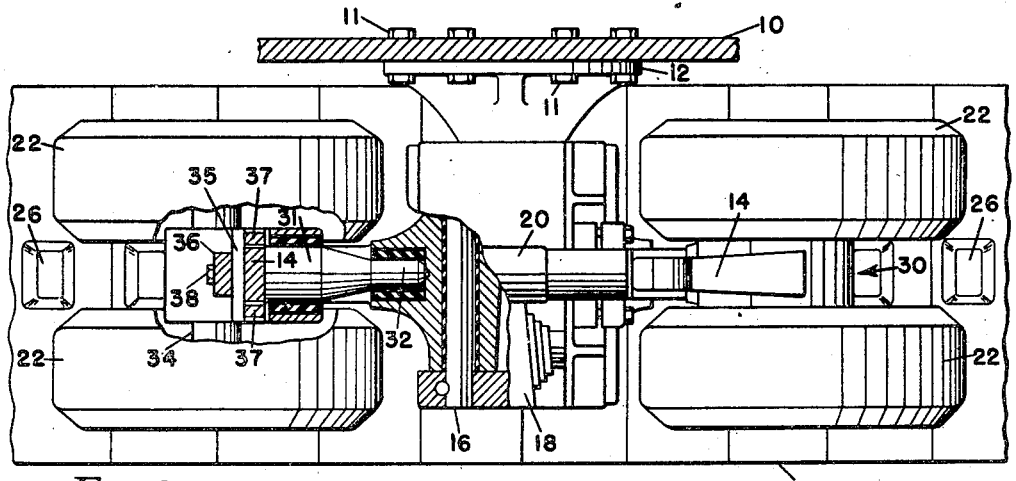
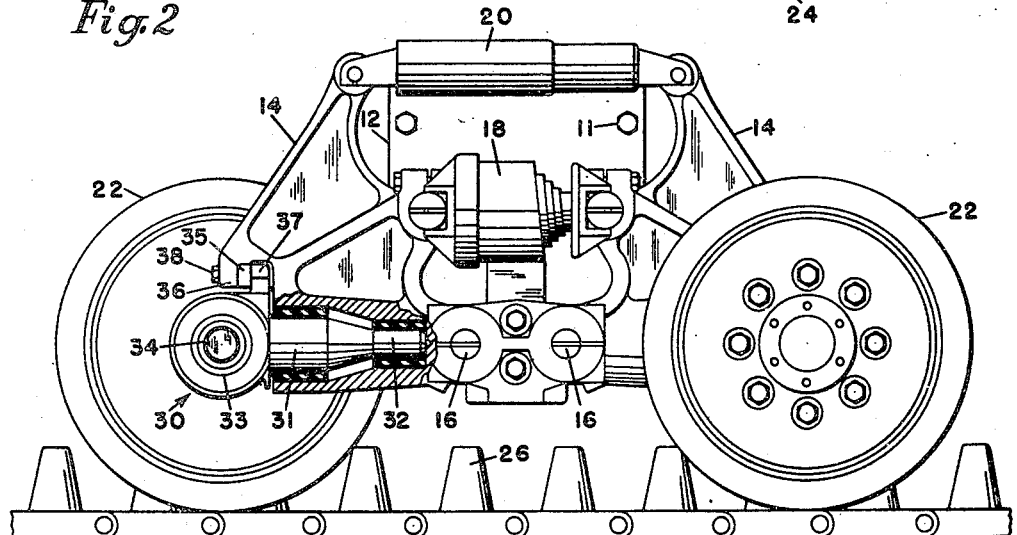
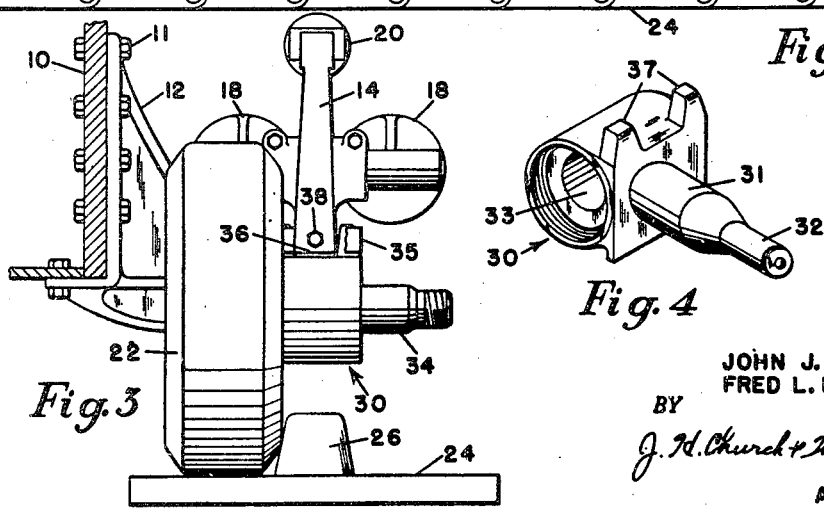

2,442,354

UNITED STATES PATENT OFFICE 2,442,354

DUAL WHEEL SUSPENSION FOR TRACK-LAYING VEHICLES

John J. Gordon, Jr., Columbus, and Fred L. Haushalter, Akron, Ohio

Application July 10, 1945, Serial No. 604,283

5 Claims. (Cl. 280—104.5)

(Granted under the act of March 3, 1883, as amended April 30, 1928; 370 O. G. 757)

The invention described herein may be manufactured and used by or for the Government for governmental purposes without the payment to us of any royalty thereon.

This invention relates to improvements in suspensions for track laying vehicles.

Track laying vehicles, particularly of the heavily loaded type, such as the ordnance or combat vehicles are commonly provided with multiple suspension units, each consisting of one or more wheels which bear against the track. More recently many of these vehicles have included the horizontal volute spring suspension in which a suitable spring is mounted between the ends of bell crank levers on other ends of which the suspension wheels were mounted.

As the loads have increased, it has been found necessary to use a plurality of wheels with a center guide track, as such wheels have rubber tires with a limited surface pressure loading. It is with this dual wheel suspension that our invention pertains.

One of the principal features of our invention is to provide an equalizing mechanism between the inside and outside wheels of a dual suspension mechanism for a track laying vehicle, whereby inclined movement of the vehicle will allow full support of the vehicle by the suspension wheels.

A further object of our invention is to provide a simplified suspension for a dual wheel, track laying bogie in which parts may be readily assembled and disassembled and in which parts are standard and reversible and in which maintenance and repair are reduced to a minimum.

A still further object of our invention is to provide a dual wheel bogie suspension having a transverse bearing which will permit limited angular movement of the wheel axle so that variations of angularity can be compensated to establish uniform support and minimum loading conditions.

Further objects and advantages of our invention will be apparent from the following description of a preferred form of embodiment thereof, taken in connection with the attached drawings, in which:

Figure 1 is an elevation of a suspension of the dual wheel bogie type with parts broken away and parts in section;

Figure 2 is a top plan view of the suspension shown in Figure 1;

Figure 3 is an end view of the suspension, and

Figure 4 is a perspective view of the trunnion member.

The suspension for a track laying vehicle may consist of one or more bogie units appropriately secured to the body 10 by suitable means 11 which attach the bracket 12. In the particular embodiment shown, the bracket 12 carries a pair of arms 14 of bell crank type, which are fulcrumed at 16 to the bracket and with their upward motion resisted by the horizontal volute spring 18. A shock absorber 20 is also placed between extensions of the arms 14 to resist sudden movement as is well known in the art.

Each of the arms 14 is intended to carry a pair of wheels 22, such wheels being suitably spaced to permit the use of a track 24 with a center guide 26. As is well known, this track may be driven by suitable means if desired, such mechanism serving as no part of our invention.

The present form of wheels 22 have a resilient tread which is suitably bonded to the wheel rim and is adapted to take a specified load based on the width of the rim. We have found however that in operating combat vehicles having loads as high as thirty to fifty tons that unusual tire damage results when the vehicle traverses other than smooth level ground. At one time, for example, when a tank was brought to a stop with the tracks inclined 2° with the horizontal, all of the inside wheels on one side of the vehicle continued to spin. This clearly indicates unequal loading on the dual tires.

In order to avoid this unbalanced condition, we provide a trunnion member 30 shown particularly in Figure 4, which is adapted to be mounted in the lower portion of the arm 14. A detail of such construction is shown in Figure 1. This trunnion is preferably provided with two bearing portions 31 and 32 which may effectively be rotatably mounted as by suitable bushings or rubber inclosed rings. The trunnion 30 also has a large transverse central bore 33 which carries the double ended wheel axle 34.

To limit the axial movement of the trunnion 30, a locking plate 35 is inserted behind the overhanging shoulder 36 on the arm 14 and in front of the upstanding lugs 37 on the trunnion. This locking plate 35 is held in position by a stud 38. The removal of the stud 38 and the plate 35 will permit the withdrawal of the trunnion from its seat.

The upstanding lugs 37 have a further function of limiting angular movement of the trunnion 30 and thus preventing contact of the wheels 22 either with the arms 14 or with the vehicle body or materially rubbing on the center track guides.

As shown in Figure 3, the lugs 37 engage on one side or the other of finished faces on the arm 14, such lugs having such angularity that a desired movement only can result. For preferable operation in one design of vehicle, an angle of 5 degrees one side or the other of a vertical was considered the limit.

The mounting of the wheels on the hubs that in turn are mounted on the axles and other details of construction are not described in full, it being understood that the wheels are customarily demountable.

Tests of the structure as compared to the fixed type of wheels indicates on some terrain that as much as 40% longer tire life is possible. This is not possible where the wheels are rigidly mounted on one spindle.

While we have shown preferred forms of embodiment of our invention, we consider other variations to be within the scope and spirit of our invention which is not to be limited except in accordance with the claims attached hereto.

What we claim is:

1. A bogie suspension for a track laying vehicle comprising a supporting bracket adapted to be secured to the frame of such vehicle, a pair of bell crank arms oppositely fulcrumed to said bracket, each of said arms having a lower portion and an upwardly extending portion, resilient means between said upwardly extending portions of said arms to resist relative movement of the latter, means to support dual spaced wheels from said lower portion of each of said arms, said means comprising an axle carrying trunnion member rotatably mounted in each of said lower portions and carried thereby, whereby the plane of said dual wheels can deviate from a vertical plane, and stop means to limit such deviation.

2. A bogie suspension for a track laying vehicle comprising a supporting bracket adapted to be secured to the frame of such vehicle, a pair of bell crank arms oppositely fulcrumed to said bracket, each of said arms having a lower portion and an upwardly extending portion, resilient means between said upwardly extending portions of said arms to resist relative movement of the latter, an axle carrying trunnion member rotatably mounted in each said lower portion, means for mounting dual spaced wheels on the axle of said axle carrying trunnion member, and stop means on said trunnion member to limit rotation thereof thereby permitting limited deviation of the plane of said wheels from a vertical plane.

3. A bogie suspension for a track laying vehicle comprising a supporting bracket adapted to be secured to the frame of such vehicle, a pair of bell crank arms oppositely fulcrumed to said bracket, each of said arms having a lower portion and an upwardly extending portion, resilient means between said upwardly extending portions of said arms to resist relative movement of the latter, a trunnion member rotatably mounted in each of said lower portions, an axle carried by each said trunnion member, laterally spaced dual wheels on said axle, means to limit rotation of said trunnion member, and means to prevent axial movement of said trunnion member.

4. A bogie suspension for a track laying vehicle comprising a supporting bracket adapted to be secured to the frame of such vehicle, a pair of bell crank arms oppositely fulcrumed to said bracket, each of said arms having a lower portion and an upwardly extending portion, resilient means between said upwardly extending portions of said arms to resist relative movement of the latter, a trunnion rotatably mounted in each of said lower portions, lugs on said trunnion adapted to engage said lower portion and thereby limit angular rotation of said trunnion, an axle carried by said trunnion, and dual spaced wheels carried by said axle.

5. A bogie suspension for a track laying vehicle comprising a supporting bracket adapted to be secured to the frame of such vehicle, a pair of bell crank arms oppositely fulcrumed to said bracket, each of said arms having a lower portion and an upwardly extending portion, resilient means between said upwardly extending portions of said arms to resist relative movement of the latter, a trunnion rotatably mounted in each of said lower portions, lugs on said trunnion adapted to engage said lower portion and thereby limit angular rotation of said trunnion, a removable locking member adjacent said lower portion and said trunnion to limit axial movement thereof and to permit its withdrawal, an axle carried by said trunnion, and dual spaced wheels carried by said axle.

JOHN J. GORDON, Jr.
FRED L. HAUSHALTER.

REFERENCES CITED

The following references are of record in the file of this patent:

UNITED STATES PATENTS

| Number | Name | Date |
| --- | --- | --- |
| 1,547,043 | Kegresse | July 21, 1925 |
| 1,547,586 | Kegresse | July 28, 1925 |
| 1,585,100 | Kegresse | May 18, 1926 |
| 1,725,817 | Mitchell | Aug. 27, 1929 |
| 1,936,954 | Robin | Nov. 28, 1933 |
| 2,121,862 | Dodge | June 28, 1938 |
| 2,308,331 | Heaslet | Jan. 12, 1943 |
| 2,367,220 | Knox | Jan. 16, 1945 |